(12) United States Patent
Heiman et al.

(10) Patent No.: US 8,768,406 B2
(45) Date of Patent: Jul. 1, 2014

(54) BACKGROUND SOUND REMOVAL FOR PRIVACY AND PERSONALIZATION USE

(75) Inventors: Arie Heiman, Sde Warburg (IL); Uri Yehuday, Bat Yam (IL)

(73) Assignee: Bone Tone Communications Ltd., Road Town (VG)

( * ) Notice: Subject to any disclaimer, the term of this patent is extended or adjusted under 35 U.S.C. 154(b) by 0 days.

(21) Appl. No.: 13/809,896

(22) PCT Filed: Oct. 11, 2011

(86) PCT No.: PCT/IB2011/054479
§ 371 (c)(1),
(2), (4) Date: Jan. 17, 2013

(87) PCT Pub. No.: WO2012/020394
PCT Pub. Date: Feb. 16, 2012

(65) Prior Publication Data
US 2013/0137480 A1    May 30, 2013

Related U.S. Application Data

(60) Provisional application No. 61/372,474, filed on Aug. 11, 2010.

(51) Int. Cl.
*H04M 1/19* (2006.01)
*G10L 15/02* (2006.01)

(52) U.S. Cl.
USPC .................................. 455/550.1; 704/233

(58) Field of Classification Search
USPC ............... 455/414.1, 550.1, 556.1; 381/71.6, 381/71.8, 71.12, 74, 94.1, 94.7; 704/231, 704/232, 233, 236, 243, 246
See application file for complete search history.

(56) References Cited

U.S. PATENT DOCUMENTS

| | | | |
|---|---|---|---|
| 5,754,537 A | 5/1998 | Jamal | |
| 5,937,070 A * | 8/1999 | Todter et al. | 381/71.6 |
| 6,859,779 B2 * | 2/2005 | Yokoyama | 704/278 |
| 7,277,722 B2 * | 10/2007 | Rosenzweig | 455/550.1 |
| 7,620,546 B2 * | 11/2009 | Hetherington et al. | 704/232 |
| 7,720,679 B2 * | 5/2010 | Ichikawa et al. | 704/233 |
| 8,199,924 B2 * | 6/2012 | Wertz et al. | 381/71.1 |
| 8,300,801 B2 * | 10/2012 | Sweeney et al. | 379/406.05 |
| 8,472,641 B2 * | 6/2013 | Short et al. | 381/94.1 |
| 8,473,287 B2 * | 6/2013 | Every et al. | 704/228 |
| 2001/0021905 A1 | 9/2001 | Burnett | |
| 2002/0072919 A1 | 6/2002 | Yokoyama | |
| 2004/0066940 A1 * | 4/2004 | Amir | 381/94.2 |
| 2006/0031066 A1 | 2/2006 | Hetherington | |
| 2009/0076815 A1 | 3/2009 | Ichikawa | |

(Continued)

FOREIGN PATENT DOCUMENTS

| WO | WO 2004/064360 A1 | 7/2004 |
|---|---|---|
| WO | WO 2012/020394 A3 | 2/2012 |

*Primary Examiner* — Blane J Jackson
(74) *Attorney, Agent, or Firm* — Oren Reches (57) ABSTRACT

A system for background sound removal, the system may include: a noise reduction circuit arranged to apply a background sound reduction process on multiple samples of background sound and speech to provide first signals that comprise residual background sound; a background cancellation circuit arranged to remove the residual background sound from the first signals to provide second signals; and an output circuit arranged to output a mixture of the second signals and at least zero selected signals to a sound generating circuit that is arranged to output audio signals representative of the mixture.

21 Claims, 5 Drawing Sheets

(56) References Cited

U.S. PATENT DOCUMENTS

2010/0016031 A1 1/2010 Patton
2011/0093262 A1 4/2011 Wittke
2012/0022860 A1 1/2012 Lloyd
2012/0059650 A1 3/2012 Faure

* cited by examiner

BACKGROUND SOUND REMOVAL FOR PRIVACY AND PERSONALIZATION USE

BACKGROUND

Mobile phones together with its Bluetooth and wired headsets have become very popular lately. By using mobile phones people can receive phone calls in different uncontrolled locations such as train, road, restaurant, gymnastic club, home, office, private rooms such as toilets, etc.

Similar situation can be occurred with wireless phone like DECT that are very popular in home and office environment.

As soon as a user answers a call of a mobile phone (denoted as party 1 or 'receiving party'), the mobile phone microphone pickups the voice of party 1 combined with the background sounds at his location. This mixed signal is transmitted by the phone to the other party (denoted as party 2). This mixed signal may expose to party 2 the background sounds of the environment of party 1 which may disclose some information about the location of party 1.

In some cases people would like to keep their privacy and not to disclose to others where they are located. To overcome this issue in some cases the receiving party (i.e. party 1) will reject the call and will initiate the call later. In other cases the receiving party will answer the call hoping that no background sound will be heard and disclose his location, if a background sound starts during the call it can embarrass party 1.

SUMMARY

A system for background sound removal may provided and may include: a noise reduction circuit arranged to apply a background sound reduction process on multiple samples of background sound and speech to provide first signals that comprise residual background sound; a background cancellation circuit arranged to remove the residual background sound from the first signals to provide second signals; and an output circuit arranged to output a mixture of the second signals and at least zero selected signals to a sound generating circuit that is arranged to output audio signals representative of the mixture.

A method for background sound removal may be provided and may include applying, by a noise reduction circuit, a background sound reduction process on multiple samples of background sound and speech to provide first signals that comprise residual background sound; removing, by a background cancellation circuit, the residual background sound from the first signals to provide second signals; and outputting, by an output circuit, a mixture of the second signals and at least zero selected signals to a sound generating circuit that is arranged to output audio signals representative of the mixture.

A non-transitory computer readable medium may be provided and may store instructions for: applying a background sound reduction process on multiple samples of background sound and speech to provide first signals that comprise residual background sound; removing the residual background sound from the first signals to provide second signals; and outputting a mixture of the second signals and at least zero selected signals to a sound generating circuit that is arranged to output audio signals representative of the mixture.

A system for background sound removal may be provided and may include a processor arranged to remove background sound from multiple samples from multiple microphones to provide background sound removed signals; a memory arranged to store multiple samples of desired background sounds; an interface coupled between the processor and a sound generating circuit; wherein the processor is further adapted to: determine whether to send to the sound generating circuit (a) only the background removed signals; or (b) a mixture of the background removed signals and samples representative of a desired background sound; and provide to the sound generating circuit, via the interface, signals in response to the determination.

A method may be provided and may include removing background sound from multiple samples from multiple microphones to provide background sound removed signals; storing multiple samples of desired background sounds; determining whether to send to the sound generating circuit (a) only the background removed signals; or (b) a mixture of the background removed signals and samples representative of a desired background sound; and providing signals to a sound generating circuit in response to the determination.

A non-transitory computer readable medium may be provided and may store instructions for removing background sound from multiple samples from multiple microphones to provide background sound removed signals; storing multiple samples of desired background sounds; determining whether to send to the sound generating circuit (a) only the background removed signals; or (b) a mixture of the background removed signals and samples representative of a desired background sound; and providing signals to a sound generating circuit in response to the determination.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Any of the mentioned below signals can be digital signals or analog signals. These signals may represent a sound and may cause various circuits (such as a sound generating circuit) to output the sound after receiving these digital or analog signals. The digital signals may also be referred to as digital representation of a sound or as digitized sound signals. A sound may include a single note or may include multiple notes. Any analog signal can be replaced by a digital signal and vice verse.

The term mixing refers to the process of generating output signals that represents two or more input signals.

The term circuit may represent a non-transitory (tangible) entity that may include at least one hardware component.

Any method illustrated below can be executed by a computer that executes instructions stored in a non-transitory computer readable medium. The computer can be a processor, a digital signal processor, or a combination thereof.

There are provided systems and methods for eliminating background sound and optionally replacing it with different background sounds that a user would like that the other party will hear. This capability provides a huge advantage for the user as he can take or make a phone call even when he doesn't want to disclose his location to the other party.

The user can choose to eliminate the background sound or alternatively to replace it by a predefined background. As an example if one is staying at home looking after his small children, when he gets a business call he can replace the background sound of kids crying by an office background sound.

Another interesting use can be, if the user (Transmitting party) will generate during his call a personalized music that even if he is located in a noisy environment the other party (Receiving party) will not hear the actual background sound but a personalized relaxing music from the transmitting party.

It should be noted that there are many techniques known in the art of noise cancellation that reduce the background sound, however all of those techniques doesn't eliminate the background noise mainly they reduce the affect of the background sound.

Figure 1:
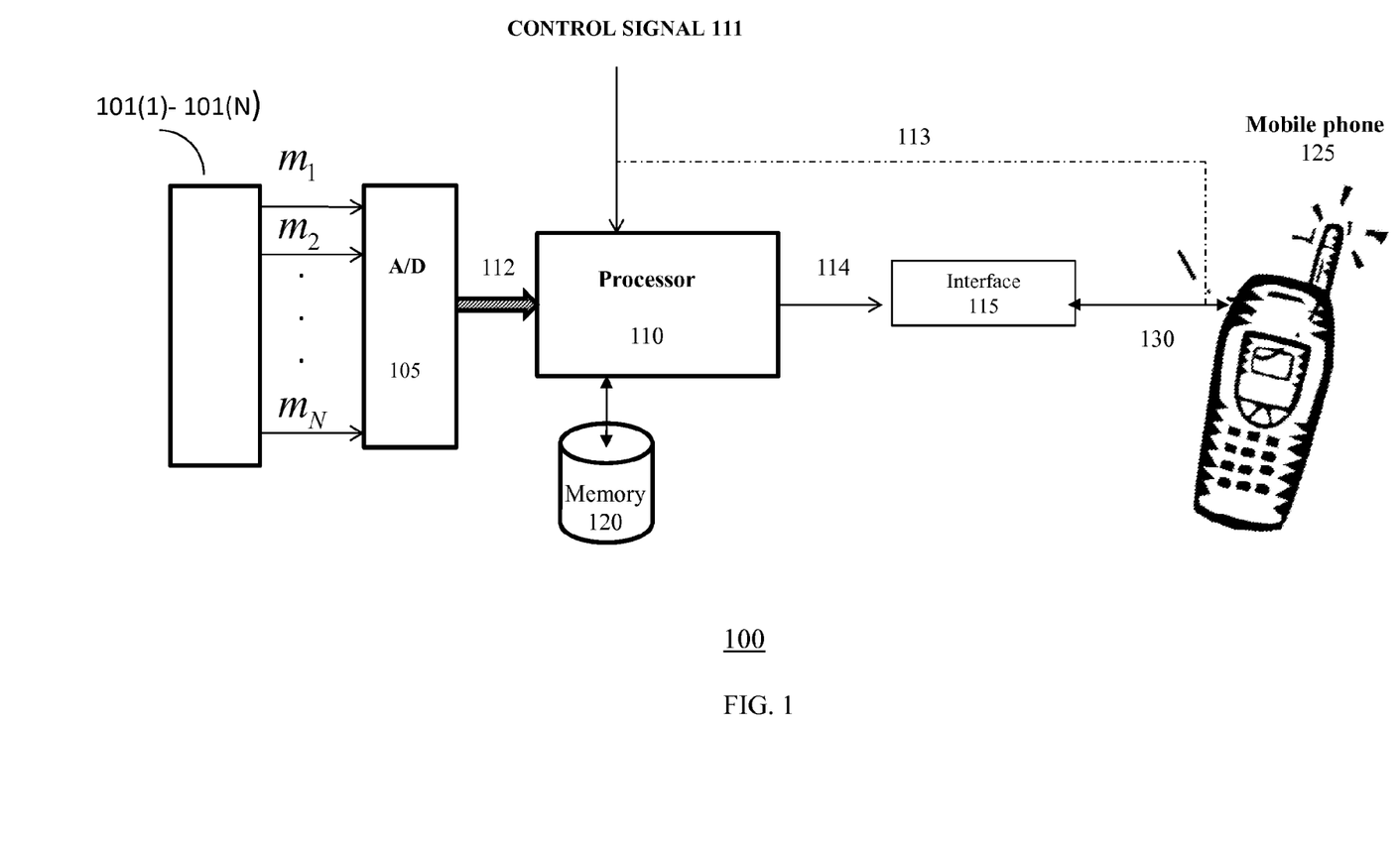
FIG. 1 illustrates a system according to an embodiment of the invention.

FIG. 1 illustrates a system 100 according to an embodiment of the invention. System 100 can be implemented in a wireless headset, such as a Bluetooth headset, or in a wired headset connected to mobile phone by wire. System 100 can be also embedded in the mobile phone or any other wireless phone. For simplicity of explanation the following text will refer to an external headset connected to a mobile phone by wire.

System 100 includes multiple (N) microphones 101(1)-101(N). In the following example N is illustrated as being equal to two or three but N may exceed three.

The output signals ($m_1$-$m_N$) from the N microphones 101(1)-101(N) are sent to analog to digital converter (A/D) 105 that digitizes these output signals to provide digital samples of these output signals. These digital samples are sent over link 112 to processor 110.

The processor 110 can be a dedicated DSP (Digital Signals Processor) or general purpose processor such as but not limited to an ARM (Advanced RISC Machine) compliant processor.

Figure 2:
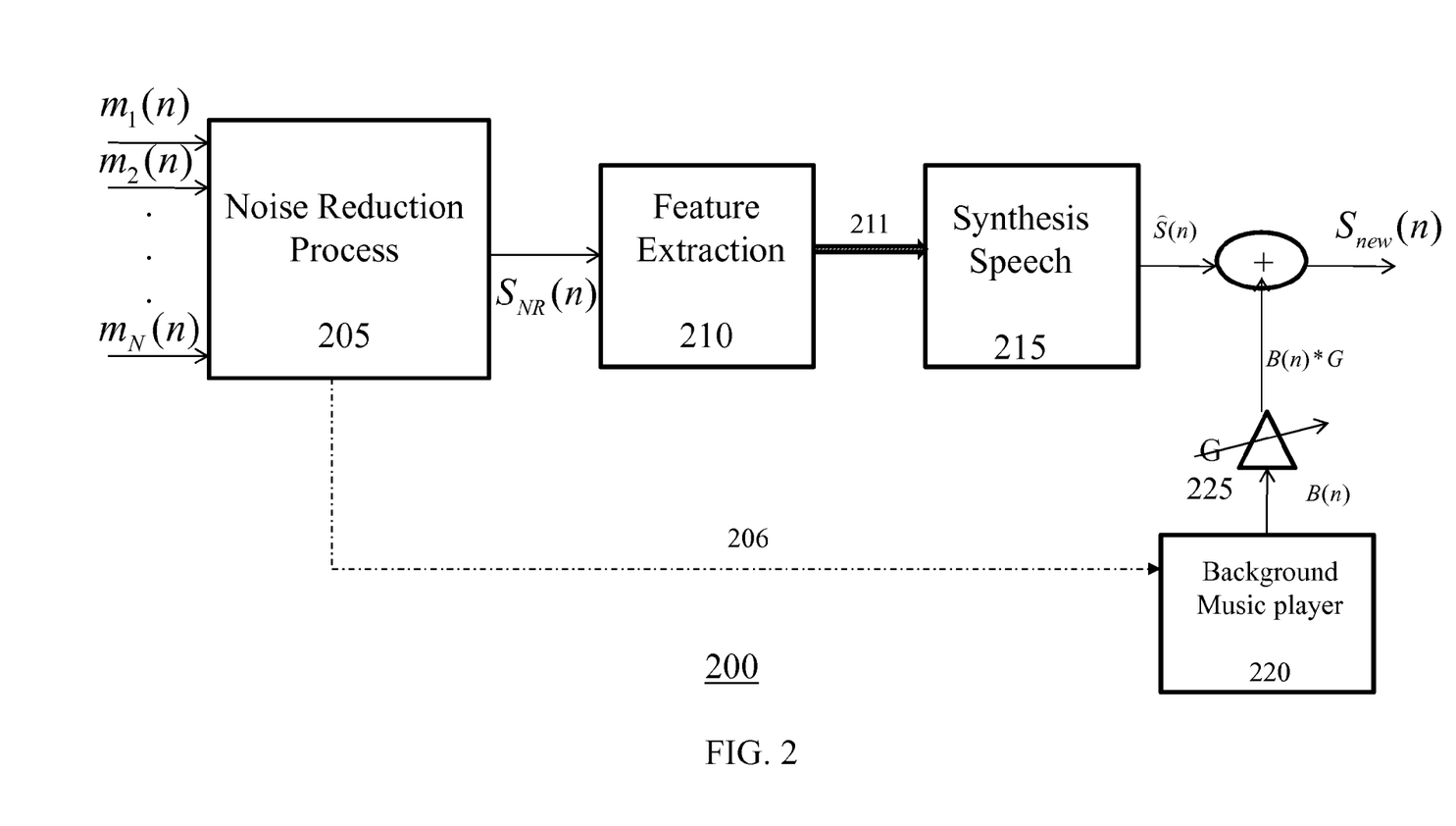
FIG. 2 illustrates a processor of the system of FIG. 1 according to an embodiment of the invention.

The processor 110 may perform the necessary signals processing as illustrated in better details in FIG. 2.

Processor 110 is connected to memory 120 which may store software that is executed by the processor 110 as well as a bank of background sounds and/or music files to be used if the user chooses to replace the actual background sound by a personalized background from the bank of background sounds.

A user can choose the desired background—this is represented by control signal 111 that is sent to the processor 110 (via an interface that is not shown). The control signal 111 can be generated by the user activation of a special key in the headset. Additionally or alternatively, mobile phone 125 can be used to provide a control signal via link 113.

The processor 110, in response to the control signal, may select the required background sound (that may be represented by digital signals) and to sent to the interface 115 a mixture of the voice and the selected background sound (via link 114). In case of wire connection between the headset and the mobile phone 125 the mixture can be converted to analog signals by using standard digital to analog convertor and its output will be connected to the mobile phone via audio connector 130. In case that there is a digital interface to the mobile phone, interface 115 can be skipped. In case the headset use wireless connection to the mobile phone such as in Bluetooth headset 115 can act as Bluetooth transmitter and receiver unit.

Thus the processor 110 may be arranged to remove background sound from multiple samples from multiple microphones to provide background sound removed signals. The memory 120 may be arranged to store multiple samples of desired background sounds. The interface 115 may be coupled between the processor 110 and a sound generating circuit (such as mobile phone 125).

The processor 110 may be further adapted to: determine whether to send to the sound generating circuit (a) only the background removed signals; or (b) a mixture of the background removed signals and samples representative of a desired background sound; and provide to the sound generating circuit, via the interface, signals in response to the determination.

FIG. 2 illustrates processor 110 of FIG. 1 according to an embodiment of the invention.

Digital samples from the N microphones are fed to noise reduction circuit 205 in order to perform noise reduction process. The background sound is regarded as noise. There are many techniques of noise reduction; some use one microphone where the background sound is estimated during the inherent pause in normal speech conversation. Another alternative can be if one use Bone conduction microphone which pickup mainly the voice with little background sound. More advanced techniques are using two microphones where one microphone detects mainly the voice of the user and other microphone detects mainly the background sound. By processing both signals one can obtain signals $S_{NR}(n)$ which is the voice of the user with reduced background noise.

Another option is to use three microphones where one microphone detects mainly the voice of the user, the second microphone detects mainly the background sound and the third microphone is a bone conduction microphone. By processing the three signals one can generate signals $S_{NR}(n)$ which is the voice of the user with reduced background noise.

Another option is to use N microphones as an array of microphones where the array of microphones is processed to act as a directional microphone, which picks up mainly the voice signals with little background sound.

In all these techniques the background sound is not totally eliminated, a residual background sound will remain; hence replacing the background noise is impossible as the user will hear the residual sound plus the new background.

To eliminate the residual sound (residual background noise), the signals from the noise reduction circuit 205 (referred to as first signals) are fed to a speech feature extraction circuit 210—that may extract the parameters of the speech from $S_{NR}(n)$. $S_{NR}(n)$ may be processed in frames of 10-20 millisecond. Per each frame speech parameters are extracted from the speech. As an example in voice frames the pitch, gain and the envelope of the speech, are estimated and in unvoiced frames the power of the excitation signals and the envelop are estimated.

In cases where the noise reduction circuit 205 provides good noise reduction, the residual signals is small relative to voice and the estimated pitch can be very accurate, the envelop estimation need some processing to reduce the background sound effect, a typical technique will be using smoothing techniques. The extracted features are feed to speech synthesis circuit 215 which may reconstruct the speech by using speech synthesis and provide an estimate of the original voice without the background sound.

$\hat{S}(n)$ is outputted from the speech synthesis circuit 215 and is an estimate of the desired voice without the background noise. It is also referred to as second signals.

Selected background signals can be sent to a background music player 220 that is arranged to play the desired background sound $B(n)$ stored in memory 120. The desired background is multiplied by fix or adaptive gain 225 that can be controlled by the user or can be set automatically. The output $S_{new}(n)=\hat{S}(n)+B(n)*G$ is the desired voice with the new background.

Alternatively, the selected background signals and the second signals, both in digital representation, can be digitally mixed and sent to the phone 130—without mixing analog representations of these signals.

It should be noted that if one would prefer to inject small amount of the original background sound it can be done as an example by injecting the primary microphone $M_1(n)$ to 220 via 206 and $S_{new}(n)=\hat{S}(n)+M_1(n-D)*G$, Where D is the delay due to the speech synthesis process between $\hat{S}(n)$ and $M_1(n)$ By modifying G, one can control the volume of the background noise in the final signals $S_{new}(n)$.

Figure 3:
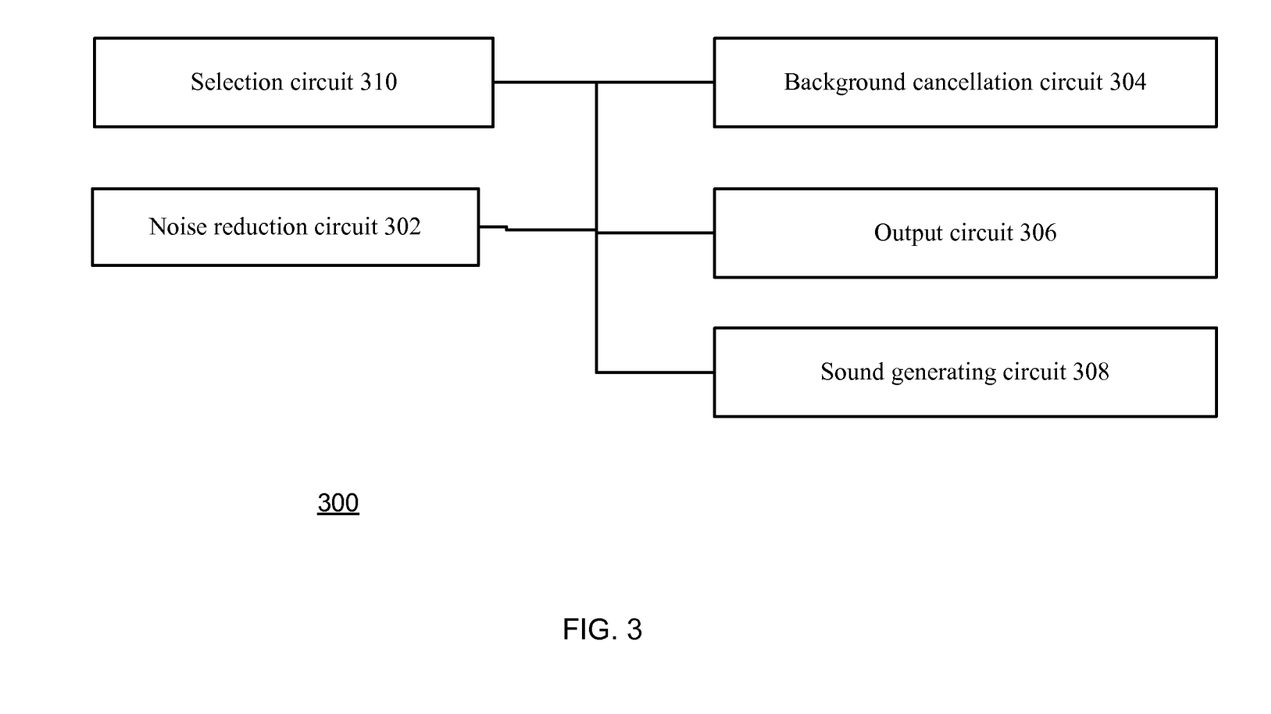
FIG. 3 illustrates a system according to an embodiment of the invention.

FIG. 3 illustrates system 300 according to an embodiment of the invention. System 300 includes: (a) a noise reduction circuit 302 arranged to apply a background sound reduction process on multiple samples of background sound and speech to provide first signals that comprise residual background sound; (b) a background cancellation circuit 304 arranged to remove the residual background sound from the first signals to provide second signals; and (c) an output circuit 306 arranged to output a mixture of the second signals and at least zero selected signals to a sound generating circuit 308 that is arranged to output audio signals representative of the mixture.

FIG. 3 illustrates the sound generating circuit 308 as belonging to system 300 but it may not belong to system 300 but rather connected to the system.

The output circuit 306 may be arranged to output only the second signals to the sound generating circuit.

The output circuit 306 may be arranged to output a mixture of the second signals and selected signals that are represent selected background sounds.

The background cancellation circuit 304 may include a speech extractor circuit that is followed by a speech synthesis circuit such as those illustrated in FIG. 2.

The system 300 is further illustrated as including a selection circuit 310 arranged to select the selected signals out of multiple signals representing different desired background sounds.

The selection circuit 310 may be arranged to select the selected signals out of at least one set of signals representing a desired background sound and the background sound.

The selection circuit 310 and the sound generating circuit 308 may belong to a same communication device.

The selection circuit 310 and the sound generating circuit 308 may belong to different components of a same communication device.

The sound generating circuit 308 may belong to a phone while the selection circuit 310 may belong to a headset that is arranged to communicate with the phone.

The noise reduction circuit 302 may be arranged to receive the multiple samples from a one microphone or from plurality of microphones.

Figure 4:
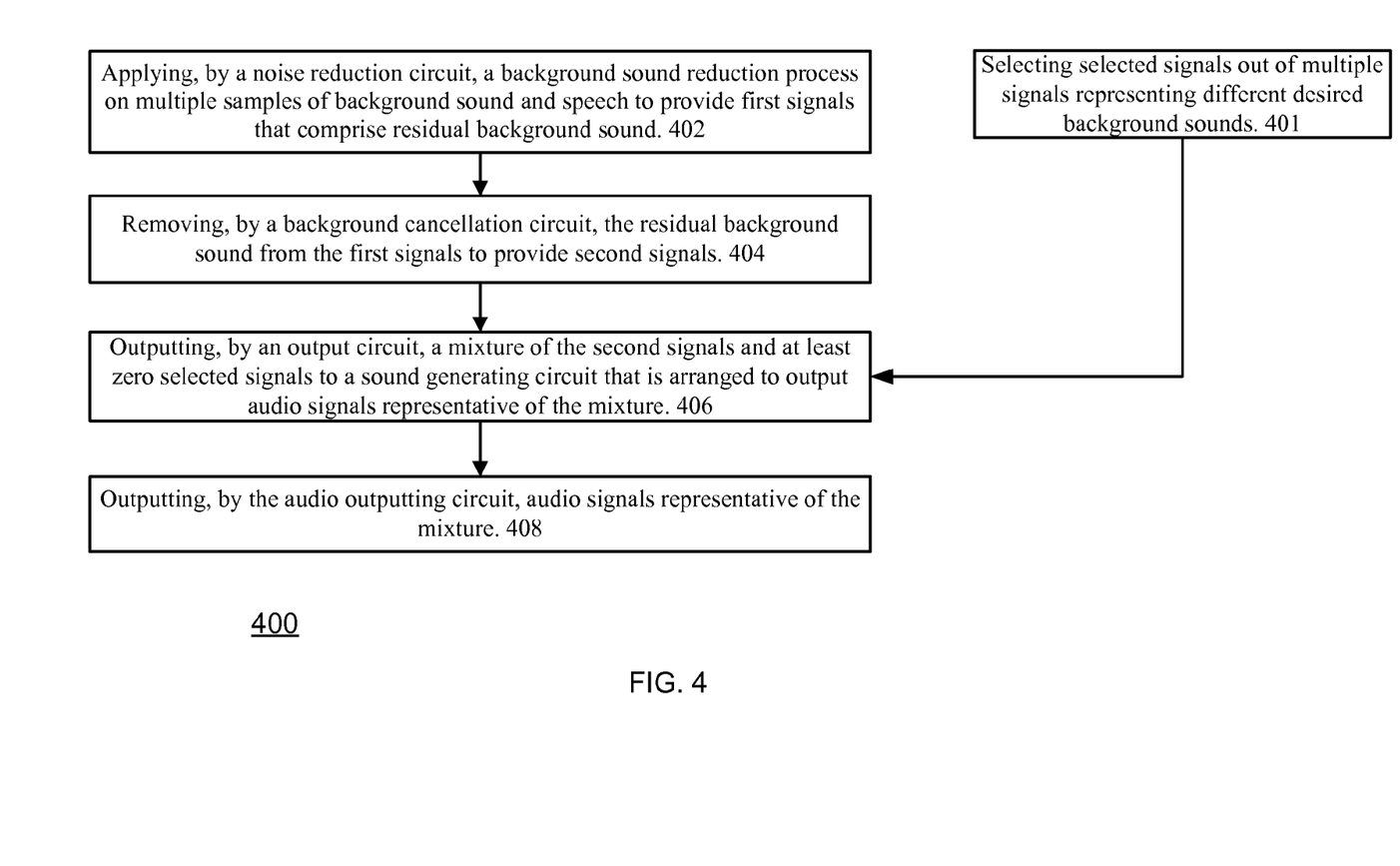
FIG. 4 illustrates a method according to an embodiment of the invention.

FIG. 4 illustrates method 400 according to an embodiment of the invention.

Method 400 includes the following stages 401, 402, 404, 406 and 408. Stage 401 may be followed by stage 406. Stage 402 may be followed by stage 404 that in turn may be followed by stage 406. Stage 406 may be followed by stage 408.

Stage 401 may include selecting selected signals out of multiple signals representing different desired background sounds. When only the second signals are outputted then the selection includes selecting zero selected signals.

Stage 401 may include selecting the selected signals out of at least one set of signals representing a desired background sound and the background sound.

Stage 402 may include applying, by a noise reduction circuit, a background sound reduction process on multiple samples of background sound and speech to provide first signals that comprise residual background sound.

Stage 402 may include receiving the multiple samples from a plurality of microphones. This may include buffering these multiple signals and then retrieving these signals from the buffers.

Stage 404 may include removing, by a background cancellation circuit, the residual background sound from the first signals to provide second signals.

Stage 406 may include outputting, by an output circuit, a mixture of the second signals and at least zero selected signals to a sound generating circuit that is arranged to output audio signals representative of the mixture.

Stage 406 may include outputting only the second signals to the sound generating circuit.

Stage 406 may include outputting a mixture of the second signals and selected signals that represent selected background sounds.

Stage 404 may include removing the residual background sound by extracting speech features from the first signals to provide intermediate signals and performing speech synthesis on the intermediate signals.

Stage 408 includes outputting, by the audio outputting circuit, audio signals representative of the mixture.

Figure 5:
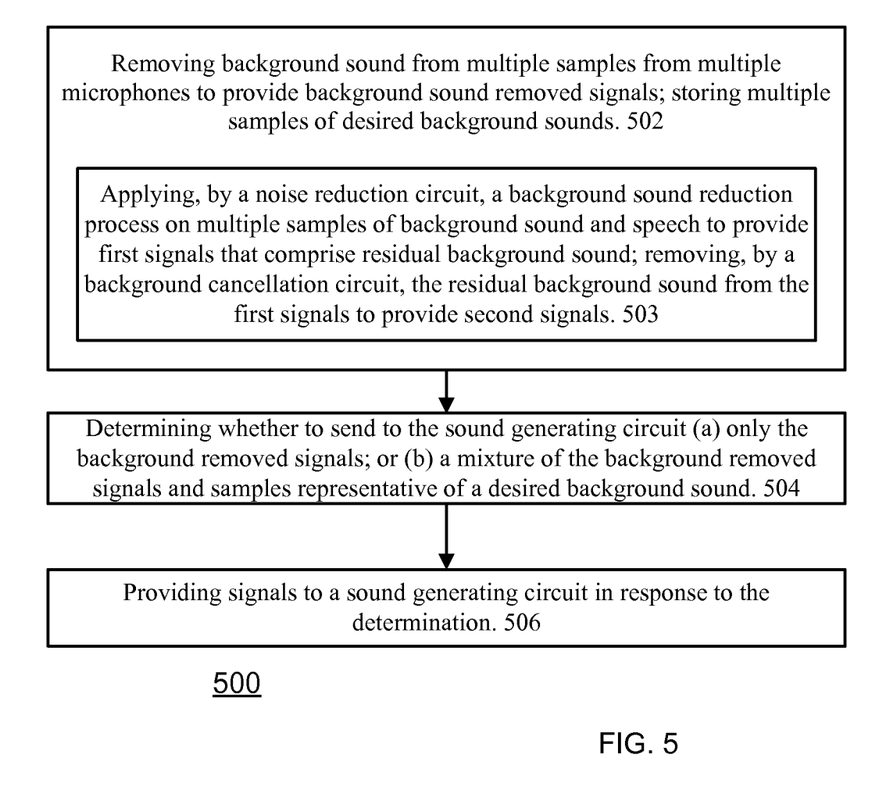
FIG. 5 illustrates a method according to an embodiment of the invention.

FIG. 5 illustrates a method 500 for background sound removal, according to an embodiment of the invention.

The method may start by stage 502.

Stage 502 may include removing background sound from multiple samples from multiple microphones to provide background sound removed signals; storing multiple samples of desired background sounds.

Stage 502 may include stage 503 of applying, by a noise reduction circuit, a background sound reduction process on multiple samples of background sound and speech to provide first signals that comprise residual background sound; removing, by a background cancellation circuit, the residual background sound from the first signals to provide second signals.

Stage 502 may be followed by stage 504 of determining whether to send to the sound generating circuit (a) only the background removed signals; or (b) a mixture of the background removed signals and samples representative of a desired background sound.

Stage 504 may be followed by stage 506 of providing signals to a sound generating circuit in response to the determination.

Stage 506 may include outputting, by an output circuit, a mixture of the second signals and at least zero selected signals to a sound generating circuit that is arranged to output audio signals representative of the mixture.

According to an embodiment of the invention the selected signals can be added to the second signals by a mixing component of a network that conveys the signals from one phone to another. This component can receive instructions from the sending phone to add selected sounds to the signals from the sending phone so that the receiving phone receives a mixture of the signals outputted from the sending phone and the selected signals. The sending phone can output selection signals indicative of which selected sound to be added and this selection signals can be intercepted and providing to the mixing component.

Yet according to another embodiment of the invention the user can select the amount of background sound to be added to the second signals. Additionally or alternatively the user may select (or the system may automatically select) the relative strength of the second signals and the selected signals. This relative strength is used during the mixing process.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system for background sound removal, the system comprises:
    a noise reduction circuit arranged to apply a background sound reduction process on multiple samples of background sound and speech to provide first signals that comprise residual background sound;
    a background cancellation circuit arranged to remove the residual background sound from the first signals to provide second signals; and
    an output circuit arranged to output a mixture of the second signals and at least zero selected signals to a sound generating circuit that is arranged to output audio signals representative of the mixture.

2. The system according to claim 1, wherein the output circuit is arranged to output only the second signals to the sound generating circuit.

3. The system according to claim 1, wherein the output signals is arranged to output a mixture of the second signals and selected signals that are represent selected background sounds.

4. The system according to claim 1, wherein the background cancellation circuit comprises a speech extractor circuit that is followed by a speech synthesis circuit.

5. The system according to claim 1, comprising a selection circuit arranged to select the selected signals out of multiple signals representing different desired background sounds.

6. The system according to claim 1, comprising a selection circuit arranged to select the selected signals out of at least one set of signals representing a desired background sound and the background sound.

7. The system according to claim 1, wherein the selecting circuit and the sound generating circuit belong to a same communication device.

8. The system according to claim 1, wherein the selecting circuit and the sound generating circuit belong to different components of a same communication device.

9. The system according to claim 1, wherein the sound generating circuit belongs to a phone while the selection circuit belongs to a headset that is arranged to communicate with the phone.

10. The system according to claim 1 wherein the noise reduction circuit is arranged to receive the multiple samples from a plurality of microphones.

11. The system according to claim 1 comprising the sound generating circuit.

12. A method for background sound removal, the method comprises:
    applying, by a noise reduction circuit, a background sound reduction process on multiple samples of background sound and speech to provide first signals that comprise residual background sound;
    removing, by a background cancellation circuit, the residual background sound from the first signals to provide second signals; and
    outputting, by an output circuit, a mixture of the second signals and at least zero selected signals to a sound generating circuit that is arranged to output audio signals representative of the mixture.

13. A non-transitory computer readable medium that stores instructions for:
    applying a background sound reduction process on multiple samples of background sound and speech to provide first signals that comprise residual background sound;
    removing the residual background sound from the first signals to provide second signals; and
    outputting a mixture of the second signals and at least zero selected signals to a sound generating circuit that is arranged to output audio signals representative of the mixture.

14. A system for background sound removal, the system comprises:
    a processor arranged to remove background sound from multiple samples from multiple microphones to provide background sound removed signals;
    a memory arranged to store multiple samples of desired background sounds;
    an interface coupled between the processor and a sound generating circuit;
    wherein the processor is further adapted to: 3 determine whether to send to the sound generating circuit (a) only the background removed signals; or (b) a mixture of the background removed signals and samples representative of a desired background sound; and
    provide to the sound generating circuit, via the interface, signals in response to the determination.

15. The system according to claim 14 wherein the processor comprises a noise reduction circuit arranged to apply a background sound reduction process on the multiple samples of background sound and speech to provide first signals that comprise residual background sound; and a background cancellation circuit arranged to remove the residual background sound from the first signals to provide second signals.

16. The system according to claim 15, wherein the background cancellation circuit comprises a speech extractor circuit that is followed by a speech synthesis circuit.

17. The system according to claim 14, wherein the processor is arranged to select the selected signals out of multiple signals representing different desired background sounds.

18. The system according to claim 14, wherein the processor is arranged to select the selected signals out of at least one set of signals representing a desired background sound and the background sound.

19. The system according to claim 14, wherein the selecting circuit and the sound generating circuit belong to a same communication device.

20. The system according to claim 14, wherein the selecting circuit and the sound generating circuit belong to different components of a same communication device.

21. The system according to claim 14, wherein the sound generating circuit belongs to a phone while the selection circuit belongs to a headset that is arranged to communicate with the phone.

* * * * *